No. 640,455. Patented Jan. 2, 1900.
J. DRINKWATER.
NUT LOCK.
(Application filed Feb. 18, 1899.)

(No Model.)

Witnesses:
E. Saure
J. Ed. Page

James Drinkwater, Inventor.
By Marion & Marion
his Attorneys.

UNITED STATES PATENT OFFICE.

JAMES DRINKWATER, OF WINCHESTER, CANADA.

NUT-LOCK.

SPECIFICATION forming part of Letters Patent No. 640,455, dated January 2, 1900.

Application filed February 18, 1899. Serial No. 706,020. (No model.)

*To all whom it may concern:*

Be it known that I, JAMES DRINKWATER, a subject of the Queen of Great Britain, residing at Winchester, in the county of Dundas, in the Province of Ontario, Canada, have invented a new and useful Improvement in Nut-Locks, of which the following is a specification.

This invention relates to nut-locks, and has for its object to provide a nut-lock which is adapted to lock a series of nuts with a fish-plate.

A further object is to provide a spring nut-lock which can be quickly and easily applied and removed, which is reliable in operation, simple in construction, which will not rattle or shake loose, and which can be manufactured at a moderate cost.

To these ends the invention consists in a nut-lock constructed substantially as hereinafter illustrated and described, and defined in the appended claim.

Figure 1:
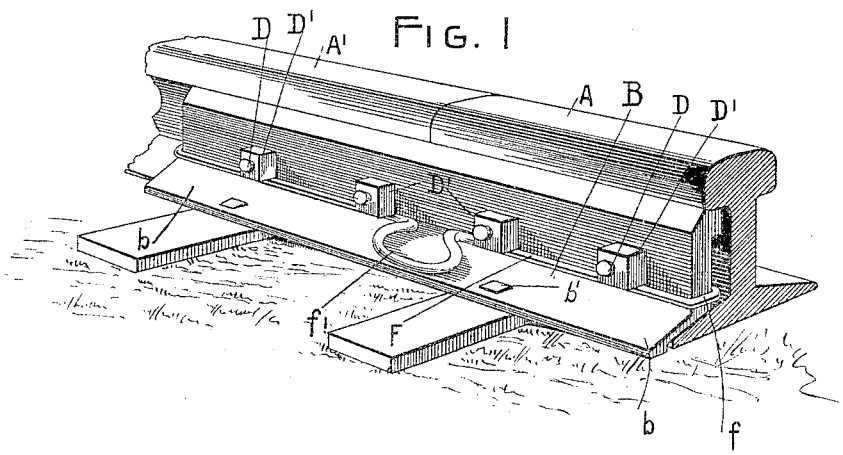
Figure 2:
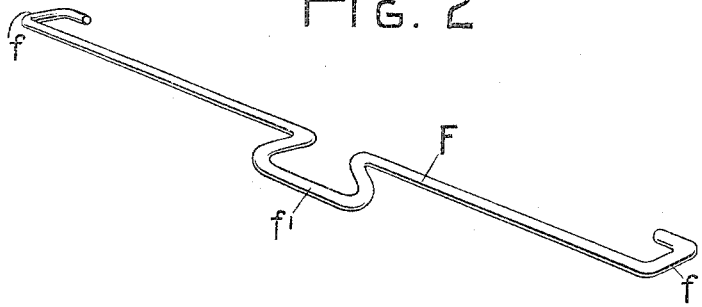

Referring to the drawings, in which similar letters of reference indicate similar parts, Figure 1 is a view in perspective of a rail-joint, showing a plurality of nuts locked by means of a nut-lock constructed in accordance with this invention. Fig. 2 is a view in perspective of the improved nut-lock detached.

In the drawings, A and A' represent the meeting ends of two rails, upon which is secured the fish-plate B, which may be of any ordinary or preferred construction. D are the bolts passing through the said rails and fish-plate and secured in place by means of the nuts D', whereby a firm strong joint is provided. The fish-plate is preferably provided with an inclined flange $b$, which is provided with suitable openings, through which are driven the spikes $b'$, by means of which the said fish-plate is firmly held in position. The inclined upper surface of the fish-plate terminates slightly below the side faces of the nuts, leaving a narrow space in which is inserted the body portion of a spring lock-bar F. The lock-bar F is provided at its central portion with a loop $f'$, and the body portion of the bar extends in opposite directions on each side of said loop $f'$, said extensions being straight and in the same horizontal plane as said loop $f'$, as clearly shown in Fig. 2 of the drawings. The outer ends of the bar F are bent inwardly in the same plane as the loop $f'$, and the body portion of the lock-bar F and the extremities of the outer ends of the body portion are bent inwardly and slightly upwardly, forming the engaging hook ends $f$. The loop $f'$ extends a suitable distance from the body portion of the lock-bar and forms not only the spring portion of the lock-bar, but also a handle, whereby the lock-bar may be applied in its operative position.

In applying the lock-bar the nuts are turned until their lower faces lie in the same horizontal plane, when the handle of the lock-bar is grasped and one of the hook ends is passed behind the fish-plate. The body portion is then pressed into the space between the nuts and the fish-plate and the other hook end is snapped into position behind the other end of the fish-plate and the loop or handle is pressed firmly down upon the flange of the fish-plate. The upward inclination of the hook ends of the lock-bar tends to retain the loop or handle firmly in its position upon the flange of the fish-plate, thus obviating all liability of the lock-bar to rattle. To release the lockbar, it is only necessary to pry out one of the hook ends from engagement with the fish-plate in an obvious manner.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

The combination with the abutting ends of two rails and a fish-plate secured thereto by bolts and nuts, of a spring lock-bar having a central loop forming a spring and a handle, a body portion adapted to rest beneath said nuts and engage the lower faces thereof, and a hook formed upon each end of said body portion and adapted to engage the ends of said fish-plate, the loop, body portion and hook extending in the same plane and the extremities of said hooks being inclined with respect to the said body portion, substantially as described.

JAMES DRINKWATER.

Witnesses:
SADIE A. SUTHERLAND,
MURIEL MUNROE.